US009944793B2

(12) United States Patent
Eling et al.

(10) Patent No.: US 9,944,793 B2
(45) Date of Patent: Apr. 17, 2018

(54) AEROGEL-CONTAINING POLYURETHANE COMPOSITE MATERIAL

(71) Applicant: BASF SE, Ludwigshafen (DE)

(72) Inventors: Berend Eling, Lemförde (DE); Stefan Auffarth, Holdorf (DE)

(73) Assignee: BASF SE (DE)

( * ) Notice: Subject to any disclaimer, the term of this patent is extended or adjusted under 35 U.S.C. 154(b) by 0 days.

(21) Appl. No.: 14/405,429

(22) PCT Filed: Jun. 3, 2013

(86) PCT No.: PCT/EP2013/061349
§ 371 (c)(1),
(2) Date: Apr. 20, 2015

(87) PCT Pub. No.: WO2013/182506
PCT Pub. Date: Dec. 12, 2013

(65) Prior Publication Data
US 2015/0240076 A1   Aug. 27, 2015

(30) Foreign Application Priority Data

Jun. 4, 2012   (EP) ..................... 12170650

(51) Int. Cl.
| | |
|---|---|
| C08L 75/04 | (2006.01) |
| C08L 39/02 | (2006.01) |
| C08L 41/00 | (2006.01) |
| B32B 27/40 | (2006.01) |
| B32B 27/06 | (2006.01) |
| B32B 27/08 | (2006.01) |
| B32B 27/30 | (2006.01) |
| C08L 29/04 | (2006.01) |
| B32B 5/18 | (2006.01) |
| C08G 18/62 | (2006.01) |
| C08G 18/64 | (2006.01) |
| C08G 18/70 | (2006.01) |
| C08G 18/78 | (2006.01) |
| C08G 18/79 | (2006.01) |
| C08G 18/10 | (2006.01) |
| C08G 18/40 | (2006.01) |
| C08J 9/33 | (2006.01) |
| C08G 18/71 | (2006.01) |

(Continued)

(52) U.S. Cl.
CPC .............. *C08L 75/04* (2013.01); *B32B 5/18* (2013.01); *B32B 27/065* (2013.01); *B32B 27/08* (2013.01); *B32B 27/302* (2013.01); *B32B 27/306* (2013.01); *B32B 27/40* (2013.01); *C08G 18/10* (2013.01); *C08G 18/283* (2013.01); *C08G 18/4081* (2013.01); *C08G 18/6212* (2013.01); *C08G 18/6216* (2013.01); *C08G 18/6283* (2013.01); *C08G 18/6423* (2013.01); *C08G 18/706* (2013.01); *C08G 18/711* (2013.01); *C08G 18/7837* (2013.01); *C08G 18/791* (2013.01); *C08G 18/792* (2013.01); *C08J 9/33* (2013.01); *C08L 29/04* (2013.01); *C08L 39/02* (2013.01); *C08L 41/00* (2013.01); *B32B 2250/22* (2013.01); *B32B 2264/102* (2013.01); *B32B 2266/0228* (2013.01); *B32B 2266/0278* (2013.01); *B32B 2307/102* (2013.01); *B32B 2307/304* (2013.01); *C08G 2101/0091* (2013.01); *C08J 2205/026* (2013.01); *C08J 2205/042* (2013.01); *C08J 2205/05* (2013.01); *C08J 2475/00* (2013.01); *C08K 3/36* (2013.01); *C08K 7/26* (2013.01); *C08K 2201/011* (2013.01); *Y10T 428/249971* (2015.04)

(58) Field of Classification Search
CPC ..... B32B 27/065; B32B 27/306; B32B 27/40; B32B 27/12; B32B 2266/0228; B32B 2266/0278; B32B 2264/102
See application file for complete search history.

(56) References Cited

U.S. PATENT DOCUMENTS

| | | | |
|---|---|---|---|
| 2,093,454 | A | 9/1937 | Kistler |
| 3,872,217 | A | 3/1975 | Merz et al. |

(Continued)

FOREIGN PATENT DOCUMENTS

| | | |
|---|---|---|
| CA | 2231428 A1 | 3/1997 |
| CN | 1196036 A | 10/1998 |

(Continued)

OTHER PUBLICATIONS

English Translation of International Preliminary Report on Patentability for PCT/EP2013/061349 dated Dec. 4, 2014.
Chinese First Office Action in patent application No. 201380041253.7 dated Aug. 15, 2016.
International Search Report for PCT/EP2013/061349 dated Jun. 25, 2013.

*Primary Examiner* — Hai Vo
(74) *Attorney, Agent, or Firm* — Drinker Biddle & Reath LLP

(57) ABSTRACT

The present invention relates to a composite material comprising nanoporous particles and at least one binder constructed from at least one isocyanate and at least one polymer P selected from the group consisting of polyvinylamine, poly(meth)acrylic acid, poly(meth)acrylic ester, polyvinyl alcohol, polyvinylthiol and mixtures thereof, wherein said at least one binder is used in an amount of 0.1 to 20 wt %, based on the amount of nanoporous particles, a composition for producing a composite material of this type, a process for producing a composite material of this type, shaped articles comprising said composite material and the use of said composite material for thermal and/or acoustical insulation.

22 Claims, No Drawings

(51) Int. Cl.
*C08G 18/28* (2006.01)
*C08K 3/36* (2006.01)
*C08K 7/26* (2006.01)
*C08G 101/00* (2006.01)

(56) References Cited

U.S. PATENT DOCUMENTS

| | | | |
|---|---|---|---|
| 3,977,993 A | 8/1976 | Lynch | |
| 4,042,536 A | 8/1977 | Dieterich et al. | |
| 4,567,228 A * | 1/1986 | Gaa | C08G 18/0804 524/588 |
| 4,582,873 A | 4/1986 | Gaa et al. | |
| 4,873,218 A | 10/1989 | Pekala | |
| 4,997,642 A * | 3/1991 | Curtis | A01N 25/04 424/678 |
| 5,086,085 A | 2/1992 | Pekala | |
| 5,137,927 A | 8/1992 | Wolff et al. | |
| 5,523,023 A | 6/1996 | Kleinstuck et al. | |
| 5,656,195 A | 8/1997 | Mielke et al. | |
| 6,040,375 A | 3/2000 | Behme et al. | |
| 6,080,475 A | 6/2000 | Frank et al. | |
| 6,121,336 A | 9/2000 | Okoroafor et al. | |
| 6,143,400 A | 11/2000 | Schwertfeger et al. | |
| 2002/0025427 A1 | 2/2002 | Schwertfeger et al. | |
| 2003/0077438 A1 * | 4/2003 | Frank | C04B 28/26 428/331 |
| 2004/0034162 A1 | 2/2004 | Laas et al. | |
| 2006/0281825 A1 | 12/2006 | Lee et al. | |
| 2007/0213417 A1 | 9/2007 | Stork et al. | |
| 2008/0171831 A1 * | 7/2008 | Kashiwazaki | C08G 18/0823 524/591 |
| 2008/0287561 A1 | 11/2008 | Menashi et al. | |
| 2009/0312448 A1 * | 12/2009 | Symons | B09B 3/0025 521/141 |
| 2011/0319508 A1 | 12/2011 | Fricke et al. | |
| 2012/0101210 A1 | 4/2012 | Nennemann et al. | |
| 2012/0142240 A1 * | 6/2012 | Eling | C08G 18/10 442/59 |
| 2013/0091682 A1 * | 4/2013 | Zhang | C08J 3/212 29/428 |

FOREIGN PATENT DOCUMENTS

| | | |
|---|---|---|
| CN | 1249730 A | 4/2000 |
| DE | 2103243 A1 | 8/1972 |
| DE | 2359606 A1 | 6/1975 |
| DE | 4441567 A1 | 5/1996 |
| DE | 19533564 A1 | 3/1997 |
| DE | 19622865 A1 | 12/1997 |
| EP | 0340707 A2 | 11/1989 |
| EP | 489319 A2 | 6/1992 |
| EP | 667370 A2 | 8/1995 |
| EP | 0672625 A1 | 9/1995 |
| EP | 672635 A1 | 9/1995 |
| EP | 1287052 A1 | 3/2003 |
| JP | 53025295 A | 3/1978 |
| WO | WO-9710188 A1 | 3/1997 |
| WO | WO-2005/103107 A1 | 11/2005 |
| WO | WO-2007/011988 A2 | 1/2007 |
| WO | WO-2010112155 A2 | 10/2010 |
| WO | WO-2012000184 A1 | 1/2012 |
| WO | WO-2012076489 A1 | 6/2012 |
| WO | WO-2012076506 A1 | 6/2012 |

* cited by examiner

AEROGEL-CONTAINING POLYURETHANE COMPOSITE MATERIAL

CROSS-REFERENCE TO RELATED APPLICATIONS

This application is a national stage application (under 35 U.S.C. § 371) of PCT/EP2013/061349, filed Jun. 3, 2013, which claims benefit of European Application No. 12170650.1, filed Jun. 4, 2012, both of which are incorporated herein by reference in their entirety.

This invention relates to a composite material comprising nanoporous particles, more particularly an aerogel, and at least one binder, a process and a composition for producing the composite material, and also the use of the composite material.

Aerogels and aerosils are highly porous solid bodies in that the predominant portion of their volume consists of pores. Aerogels can be based for example on silicate but also on plastics or carbon. The diameter of aerogel pores is in the nanometer range. Owing to their high pore volume, aerogels are particularly useful as insulating materials combining outstanding insulation properties with low density. Aerogels are initially present as particles, and can be subjected with the use of binders to a shaping process to form plates by pressing for example.

Aerogels are also described in the literature as gels with air as dispersion medium. Aerogels are obtainable by drying a suitable gel. Aerogel in the context of the present invention also comprehends xerogels and cryogels. The shaping process of the aerogel is concluded during the sol-gel transition. Once the solid gel structure has become developed, the outer form can only be changed by comminution, for example grinding.

EP-A-0 340 707 discloses insulating materials from 0.1 to 0.4 $g/cm^3$ in density with good thermal insulation capacity and sufficiently high compressive strength, which are obtained by adhering silica aerogel particles together using an organic or inorganic binder. Cement, gypsum, lime and waterglass are mentioned as examples of suitable inorganic binders.

EP 489 319 A2 discloses composite foams based on silica aerogel particles and a styrene polymer foam. U.S. Pat. No. 6,121,336 discloses improving the properties of polyurethane foams by incorporation of silica aerogels. DE 44 41 567 A1 discloses composite materials from aerogels and inorganic binders where the aerogel particles have corpuscle diameters of less than 0.5 mm. EP 672 635 A1 discloses shaped articles from silica aerogels and binders that additionally utilize sheet-silicates or clay minerals. U.S. Pat. No. 6,143,400 discloses composite materials from aerogel particles and an adhesive that utilize aerogel particles having diameters less than 0.5 mm. DE 105 335 64 A1 discloses composite materials comprising aerogel particles, binders and a fiber agent. WO 2007/011988 A2 discloses compositions with so-called hybrid aerogel particles and a binder wherein the aerogel particles may form covalent bonds with the binder.

US 2008/0287561 A1 discloses composite materials comprising at least one polymer and at least one aerogel. There is a coating on the surface of the aerogel to prevent the polymer penetrating into the aerogel. US 2008/0287561 A1 discloses that the aerogel is supposed to be in deficiency relative to the entire composite material, so the composite material consists predominantly of binder.

According to the prior art, producing shaped articles of this type frequently necessitates the use of high binder contents. In addition, many performance characteristics such as, for example, thermal conductivity or breaking strength are still in need of improvement. There are frequently also problems with the production of shaped articles. Numerous organic binders cannot be used on account of their high viscosity. The use of low-viscosity dispersions frequently requires an excessive degree of dilution with aqueous solvents, which has the disadvantage that the binder in the dispersions does not enter any bond with the generally hydrophobic silica aerogel particles owing to the absence of aerogel surface wetting.

It is an object of the present invention to provide composite materials that combine a relatively low binder content with an improved, i.e., reduced, thermal conductivity and a low density. It is a further object of the present invention to obtain a low binder content, so a particularly low fire load is achievable for the composite material. The composite materials shall further comprise a particularly effective binder, so particularly good adherence is obtained even from a particularly low amount of binder. The composite materials shall also be obtainable in a simple manner, for example through improved utility of organic binders. It is yet a further object of the present invention to provide composite materials that have an at least partly open-cell structure and so are moisture permeable.

These objects are achieved according to the present invention by a composite material comprising nanoporous particles and at least one binder constructed from an at least one isocyanate and at least one polymer P selected from the group consisting of polyvinylamine, poly(meth)acrylic acid, poly(meth)acrylic ester, polyvinyl alcohol, polyvinylthiol and mixtures thereof, wherein said at least one binder is used in an amount of 0.1 to 20 wt %, based on the amount of nanoporous particles.

The objects are further achieved by a composition for producing a composite material according to the present invention, comprising nanoporous particles, at least one isocyanate and at least one polymer P selected from the group consisting of polyvinylamine, poly(meth)acrylic acid, poly(meth)acrylic ester, polyvinyl alcohol, polyvinylthiol and mixtures thereof.

The objects are further achieved by a process for producing a composite material according to the present invention, which comprises mixing said nanoporous particles, said at least one isocyanate and said at least one polymer P selected from the group consisting of polyvinylamine, poly(meth)acrylic acid, poly(meth)acrylic ester, polyvinyl alcohol, polyvinylthiol and mixtures thereof, crosslinking by reacting said at least one isocyanate and said at least one polymer P and the material thus obtained being either a) subjected directly to a shaping operation and optional curing, or b) pelletized, stored and subjected to shaping and optionally curing as or when required.

The objects are further achieved by a shaped article, more particularly a plate, formed from a composite material according to the present invention and at least one further foam, more particularly polyurethane and/or polystyrene, by a shaped article formed from a composite material according to the present invention on which at least one outer layer is laminated, and also the use of a composite material according to the present invention or of a shaped article according to the present invention for thermal and/or acoustical insulation.

In the context of the present invention, unless otherwise stated, the terms used are defined as follows and the parameters mentioned are measured as follows:

Particle: Particles are corpuscles which either are monolithic, i.e., consist of one piece, or alternatively comprise essentially particles having a diameter smaller than that of the corpuscle, which are optionally bonded together by a suitable binder or joined together by pressing to form larger corpuscles.

Porosity: Ratio of void volume to overall volume, as measured by nitrogen adsorption and desorption (<100 nm) and mercury porosimetry (>100 nm)

Open-cell content: Ratio of void volume of interparticulate interstices to overall volume, as measured according to EN 12087 Method 2A, drip-drained. The volume of the interparticulate interstices is determined by the volume of water imbibed by the plate following storage under water.

Hydrophobic: Hydrophobic substances in the context of the present invention are such substances as have a contact angle of more than 90° with water at room temperature.

Nanoporous: is to be understood as meaning that the pores in the particles generally have a size in the range from 0.1 to 500 nm, more particularly <200 nm and more preferably <100 nm ($d_{50}$) and the porosity is generally from 50 to 99, more particularly from 70 to 99 and more preferably from 80 to 99.

Granular: is to be understood as meaning that the corpuscles are present in a size of generally 0.001 to 100 mm and preferably of 0.01 to 10 mm ($d_{50}$) and the ratio of the longest axis to the shortest axis of the particles is preferably in the range from 4:1 to 1:1.

Aerosil: is to be understood as referring to pyrogenous silica obtainable for example by hydrolysis of silicon tetrachloride and preferably having a primary particle size of 5 to 50 nm (d50).

Molecular weight: The reported molecular weights are based on the number average Mn.

$d_{50}$ value: Size than which 50% of the particles are smaller and 50% are larger.

Water-soluble: is to be understood as referring to a substance which when present in water at not less than 0.5 wt %, preferably not less than 1.0 wt % and more preferably not less than 5 wt % forms a monophasic, visually transparent system therewith.

Emulsifiable: is to be understood as referring to a substance which is liquid under the prevailing conditions and which when present in water at not less than 0.5 wt %, preferably not less than 1.0 wt % and more preferably at not less than 5 wt % forms a stable system therewith which remains monophasic for a prolonged period (>5 days). The emulsion may appear from visually almost clear and colorless to slightly bluish to milky and cloudy.

Dispersible: is to be understood as referring to a substance which is solid under the prevailing conditions and which when present in water at not less than 0.5 wt %, preferably not less than 1.0 wt % and more preferably not less than 5.0 wt % forms a stable system therewith which remains monophasic for a prolonged period (>5 days). The dispersion may appear from visually almost clear and colorless to slightly bluish to milky and cloudy.

Preferred embodiments of the present invention will now be recited, while the specifically recited embodiments shall also be combinable.

Nanoporous Particles

Preferred nanoporous particles are granular. Therefore, the present invention preferably relates to the composite material of the present invention wherein the nanoporous particles are granular.

The nanoporous particles in further preferred embodiments are aerogels or aerosils. These can be organic, inorganic or organic-inorganic.

Suitable aerogels for the composite materials of the present invention are more particularly those based on oxides, more particularly silicon dioxide and metal oxides, more particularly alumina, titania and zirconia, or those based on organic substances, for example melamine-formaldehyde condensates (U.S. Pat. No. 5,086,085), polyurea condensates (US 2011/0319508) resorcinol-formaldehyde condensates (U.S. Pat. No. 4,873,218) and also aerogels obtainable by polymerization of furfural with phenolic novolak resins. Of particular suitability are compounds which are suitable for sol-gel technology, see for example WO 97/10188 A1, page 7, first paragraph, for example silicon or aluminum compounds. The aerogels used according to the present invention can also be based on mixtures of the materials mentioned above.

Preference is given to aerogels comprising silicon compounds. Particular preference is given to aerogels comprising $SiO_2$ and more particularly $SiO_2$ aerogels, which are optionally organomodified.

Particularly preferred aerogels have the following parameters:

Porosity: 50 to 99%, especially 70 to 99%, more preferably 80 to 99%

Density: from 30 to 300 g/L, preferably ≤150 g/L

Particle diameter: from 0.001 to 100 mm, preferably from 0.01 to 10 mm ($d_{50}$)

Pore diameter: 0.1 to 500 nm, especially <200 nm, more preferably <100 nm.

In addition, the thermal conductivity of aerogels decreases with increasing porosity and decreasing density, down to a density in the region of 0.1 g/cm³. Therefore, aerogels with porosities above 60% and densities between 0.1 and 0.4 g/cm³ are preferable. The thermal conductivity of granular aerogel should preferably be less than 40 mW/m*K and more preferably less than 25 mW/m*K.

Particularly preferred aerogels are silica aerogels that comprise essentially amorphous silicon dioxide, more preferably consist thereof, but, depending on their method of making, may further comprise organic compounds.

Silica aerogel particles are obtainable in the known manner from waterglass solution via the stages of silica hydrogel, solvent exchange and subsequent supercritical drying. The bead form generally present is the result of a fast-gelling silica sol being sprayed from a specially designed die and the drops gelling in flight. Further details on this are described in DE-A-21 03 243. The exchange of hydrogel water for other liquids that are chemically inert with regard to silicon dioxide is described for example in U.S. Pat. No. 2,093,454, U.S. Pat. No. 3,977,993 and JP-A-53/025 295.

The aerogel particles can be used in monomodal, bimodal or multimodal distribution.

In a preferred embodiment, the nanoporous particles, more particularly the aerogel particles, have a coating, more particularly hydrophobic groups on the surface.

The present invention therefore preferably relates to the composite material of the present invention wherein the nanoporous particles, more particularly the aerogel particles, have a coating, more particularly hydrophobic groups on the surface.

Suitable groups for durable hydrophobicization are for example trisubstituted silyl groups of general formula —Si$(R)_3$, preferably trialkyl and/or triarylsilyl groups, where each R is independently a nonreactive organic moiety such as $C_1$-$C_{18}$ alkyl or $C_6$-$C_{14}$ aryl, preferably $C_1$-$C_6$ alkyl or phenyl, more particularly methyl, ethyl, cyclohexyl or phenyl, which moiety may be additionally substituted with functional groups. The use of trimethylsilyl groups is particularly advantageous for durably hydrophobicizing the aerogel. Introducing these groups can be accomplished by gas phase reaction between the aerogel and, for example, an activated trialkylsilane derivative, e.g., a chlorotrialkylsilane or a hexaalkyldisilazane (cf. R. Iler, The Chemistry of Silica, Wiley & Sons, 1979).

The degree of hydrophobicization is preferably sufficient to permanently prevent any ingress of water into the interior of the nanoporous particles. At the same time, the proportion of organic material in the modified particles should be as low as possible in order that the flammability of the particles may be minimized.

Functionalizing the Nanoporous Particles

The nanoporous particles, more particularly aerogels, can be fixed in the binder. Fixing the nanoporous particles in the binder can be augmented by introduction of reactive groups into the nanostructure or by incorporating small amounts of binders.

Functionalized chemical compounds such as alkoxysilanes, e.g., 3-aminopropyltriethoxysilane or 3-aminopropyltrimethoxysilane, are useful for chemically functionalizing the nanoporous particles, in particular the aerogels. These reactive groups can be bonded to the nanoporous particles, in particular the aerogels, in a first step via the silane unit. In a second step the amino group allows chemical attachment to the binder.

Suitable systems for functionalization are described at very great length in WO 2005103107 A1, page 9, line 18 to page 15, line 4, and are expressly incorporated in this application by reference.

Binders

The composite material of the present invention comprises at least one binder constructed from at least one isocyanate and at least one polymer P selected from the group consisting of polyvinylamine, poly(meth)acrylic acid, poly(meth)acrylic ester, polyvinyl alcohol, polyvinylthiol and mixtures thereof. Polymers P suitable for the purposes of the present invention comprise Zerewitinow-reactive groups.

It is essential to the invention that the at least one binder be present in a particularly low amount of 0.1 to 20 wt %, preferably 4 to 15 wt % and more preferably 5 to 10 wt %, all based on the amount of nanoporous particles. This means for the purposes of the present invention that the nanoporous particles are present in a correspondingly high amount, i.e., in that, for example, from 0.1 to 20 parts by weight, preferably from 4 to 15 parts by weight and more preferably from 5 to 10 parts by weight of binder are correspondingly present per 100 parts by weight of nanoporous particles.

Any isocyanate known to a person skilled in the art can generally be used for the purposes of the present invention, although preferably the at least one isocyanate has a molecular weight in the range from 84 to 10 000 g/mol.

The present invention accordingly preferably relates to that composite material according to the present invention wherein the at least one isocyanate has a molecular weight in the range from 84 to 10 000 g/mol.

The at least one isocyanate of the present invention may be a monomolecular isocyanate, preferably an organic isocyanate, or a prepolymer formed from at least one isocyanate and at least one compound comprising at least one isocyanate-reactive group.

The present invention accordingly relates with preference to the composite material of the present invention wherein the at least one isocyanate is an organic isocyanate. Aliphatic organic or aromatic organic isocyanates are useful, while aliphatic organic isocyanates are particularly preferred according to the present invention.

The present invention accordingly also relates with preference to the composite material of the present invention wherein said at least one isocyanate is a prepolymer formed from at least one isocyanate and at least one compound comprising Zerewitinow-reactive groups.

It is further preferable for the at least one isocyanate to be water-emulsifiable. The present invention therefore relates with preference to the composite material of the present invention wherein the at least one isocyanate is water-emulsifiable.

Useful organic isocyanates include commonly known aromatic, aliphatic, cycloaliphatic and/or araliphatic isocyanates, preferably diisocyanates, for example 2,2'-, 2,4'- and/or 4,4'-diphenylmethane diisocyanate (MDI), polymeric MDI, 1,5-naphthylene diisocyanate (NDI), 2,4- and/or 2,6-tolylene diisocyanate (TDI), 3,3'-dimethylbiphenyl diisocyanate, 1,2-diphenylethane diisocyanate and/or phenylene diisocyanate, tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), 1,4-cyclohexane diisocyanate, 1-methyl-2,4- and/or -2,6-cyclohexane diisocyanate and/or 4,4'-, 2,4'- and 2,2'-dicyclohexylmethane diisocyanate (H12MDI), preferably 2,2'-, 2,4'- and/or 4,4'-diphenylmethane diisocyanate (MDI), polymeric MDI, 1,5-naphthylene diisocyanate (NDI), 2,4- and/or 2,6-tolylene diisocyanate (TDI), hexamethylene diisocyanate (HDI), 4,4'-, 2,4'- and 2,2'-dicyclohexylmethane diisocyanate (H12MDI) and/or IPDI, more particularly 4,4'-MDI and/or hexamethylene diisocyanate.

Particularly preferred isocyanates are hexamethylene diisocyanate HDI and isophorone diisocyanate (IPDI), in particular low-volatile derivatives of these isocyanates such as trimers, dimers, biuret and allophanate.

The at least one compound comprising at least one Zerewitinow-reactive, i.e. isocyanate-reactive, group may be any of the commonly known isocyanate-reactive compounds, for example polyesterols, polyetherols, polyether amines and/or polycarbonate diols, which are typically also subsumed under the term "polyols", with a number average molecular weight (Mn) of 50 to 12 000 g/mol, preferably 100 to 10 000 g/mol, more particularly 200 to 8000 g/mol and a hydroxyl value of 14 to 1839 mg KOH/g, more particularly of 28 to 600 mg KOH/g and a functionality of 2 to 8, preferably 2 to 3, more particularly 2.

A particularly preferred embodiment utilizes by way of isocyanate-reactive compounds polyols, preferably polyalkylene glycols, more particularly polytetrahydrofuran (PTHF), polybutylene glycols, polypropylene glycols, polyethylene glycols and copolymers obtained by addition reaction of ethylene oxide, butylene oxide and propylene oxide. The copolymers may have a block or mixed structure. Particularly preferred polypropylene glycols and polybutylene glycols have a molecular weight of 400 to 10 000 g/mol more particularly of 600 to 8000 g/mol and preferably a functionality of 2 to 8 and more preferably 2 to 3.

Particularly preferred polyethylene glycols have a molecular weight of 61 to 8000 g/mol and more particularly of 200 to 6000 g/mol and preferably a functionality of 2 to 8 and more preferably 2 to 3.

The preferably water-emulsifiable isocyanates used are preferably water-emulsifiable prepolymers admixed with polymers comprising polyethylene oxide. The abovementioned polyethylene glycols can be used for this purpose. It is further also possible to use polyethylene oxide polymers of the following structure:

$$RO(CH_2-CH_2O)_nH$$

where
R is an alkyl radical of more particularly 1 to 4 carbon atoms
n is a number from 3 to 50.

Typical examples of such components are methoxypolyethylene glycols with a molecular weight of 200 to 2000 g/mol and preferably of 300 to 1000 g/mol. Prepolymers with alkylpolyethylene glycol are known from GB 1528612.

In a further preferred embodiment, the at least one compound used for preparing the isocyanate-based prepolymers which comprises at least one Zerewitinow-reactive group is an isocyanate-reactive sulfonic acid. These compounds are added to isocyanates to render them emulsifiable in water. Suitable isocyanate-reactive sulfonic acids are known per se to a person skilled in the art and are described in EP 1287052 B1 for example. 2-(Cyclohexylamino)ethanesulfonic acid and/or 3-(cyclohexylamino)propanesulfonic acid are preferred isocyanate-reactive sulfonic acids.

The present invention accordingly relates with particular preference to the composite material of the present invention wherein the at least one compound used for preparing the isocyanate-based prepolymers, which comprises at least one Zerewitinow-reactive group, is a polyol and/or a sulfonic acid.

In a further embodiment of the present invention, the water emulsifiability of the isocyanates, in particular of the isocyanate-based prepolymers is improved by modifying the prepolymers with ionizable groups such as aminosilanes, see WO 2010/112155 A2 and/or ionic groups such as carboxylates, phosphates and sulfates see DE-A-2 359 606. This approach is particularly suitable when aqueous alkali metal silicates and/or colloidal silica sols are used.

The prepolymers which the present invention prefers for use as isocyanates are preferably water-dispersible, particularly in the event of using polyethylene glycols having a molecular weight of 200 to 6000 g/mol and/or alkylpolyethylene glycols having a molecular weight of 200 to 2000 g/mol.

The present invention accordingly relates with preference to the composite material of the present invention wherein said polyol is a polyethylene glycol having a molecular weight of 200 to 6000 g/mol and/or an alkylpolyethylene glycol having a molecular weight of 200 to 2000 g/mol.

In a further preferred embodiment, the water-emulsifiability of in particular of the isocyanates, prepolymers is achieved and/or improved through the use of surfactants and/or other surface-active substances. Such surface-active substances include a broad pallet of wetting agents and surfactants and are effective in improving the emulsifiability of the polyurethane prepolymer in water, as described for example in Handbook of Industrial Surfactants, 4th Edition, pages 6279-6331. Emulsification auxiliaries include but are not limited to the following: polyalkoxylates, polyalkylene glycols, polyureas, polyglycosides and fatty alcohol esters.

Emulsions of the prepolymer are prepared in a preferred embodiment using water since it dramatically reduces the viscosity of prepolymers, does not penetrate into the pores of the nanoporous particles, in particular the aerogels, and reacts with isocyanate to form urea. Optionally, waterglass or (aqueous) silica sols can also be used instead of water. By using these media, the proportion of inorganic compounds in the composite material can be increased. Moreover, components can be added to the water that improve the wetting of the nanoporous particles, in particular of the aerogels. The penetration of water into the pores of the gel is generally not an issue, since the nanoporous particles, in particular the aerogels have strongly water-repelling properties. Components can be added to the water that improve the wetting of aerogels.

Polymer P

The binder in the composite material of the present invention is constructed from at least one polymer P selected from the group consisting of polyvinylamine, poly(meth)acrylic acid, poly(meth)acrylic ester, polyvinyl alcohol, polyvinylthiol and mixtures thereof, as well as the at least one isocyanate described. Suitable polymers P for the purposes of the present invention comprise Zerewitinow-reactive groups, i.e., groups capable of reacting with isocyanate groups.

Zerewitinow-active groups are generally polar groups which can typically interact with water also. Polymers having a high loading of Zerewitinow-reactive groups are consequently also typically water-soluble from a certain degree of loading with Zerewitinow-reactive groups. Below this degree of loading, there is also a loading bandwidth within which polymers of this type are dispersible in water. At a lower level of loading, the polymers are neither water-soluble nor water-dispersible.

Suitable polymers P for the purposes of the present invention are preferably water-soluble or water-dispersible, it is particularly preferable for the polymers P to be water-soluble.

The present invention accordingly relates with preference to the composite material of the present invention wherein the polymer P is water-soluble or water-dispersible.

Polyvinylamine suitable for the purposes of the present invention comprises recurring vinylamine units of the formula $$-CH_2-CHNH_2-$$

In a very particularly preferred embodiment, the polymer P is a polyvinylamine, more particularly with a molar mass of 10 000 to 1 000 000 g/mol and preferably of 10 000 to 500 000 g/mol. In addition to the amino groups, the polymer chain may display further substituents, more particularly formamide moieties.

In a preferred embodiment, the polyvinylamine is obtainable by free-radical or cationically initiated polymerization of vinylformamide and hydrolyzing the formamide groups in the acidic or basic region. Hydrolysis may be partial or complete.

Polyvinyl alcohol suitable for the purposes of the present invention comprises recurring vinyl alcohol units of the formula $$-CH_2-CHOH-$$

In a very particularly preferred embodiment, polymer P is a polyvinyl alcohol, especially with a molar mass of 10 000 to 500 000 g/mol, preferably of 20 000 to 200 000 g/mol and more preferably of 30 000 to 100 000 g/mol. In addition to the hydroxyl groups, the polymer chain may display further substituents, more particularly alkyl or aryl moieties, and also side chains such as, for example, butyral which are grafted-on or incorporated via comonomers.

Polyvinyl alcohols are obtainable by transesterification or by alkaline saponification (hydrolysis) of polyvinyl acetate.

Preference is further also given to polyvinyl alcohol copolymers obtainable from polyvinyl acetate copolymers.

Hydrolysis may be partial or complete, for example at 70 to 99%, preferably 80 to 90%. Preferred polymers have a degree of hydrolysis in the range from 70 to 100 mol %, depending on the intended use. The acetyl groups remaining in a partial saponification may form a random or block-type distribution in the polymer, depending on the method. The distribution of these acetyl groups can affect properties such as melting point, surface tension of aqueous solutions or protective-colloid properties.

It has transpired that incompletely hydrolyzed polymers have adherence advantages in the production of composite plates.

The poly(meth)acrylic acid or ester suitable for the purposes of the present invention comprises recurring acrylic or methacrylic acid or ester units of the formula

—$CH_2$—$CR''CO_2R'''$—, where R'' may be hydrogen or alkyl of 1 to 4 carbon atoms and R''' may be hydrogen or alkyl of 1 to 12 carbon atoms or aryl of 5 to 12 carbon atoms.

In a very particularly preferred embodiment, polymer P is a polyacrylic acid or ester, especially with a molar mass of 1000 to 500 000 g/mol, preferably of 1000 to 400 000 g/mol and more preferably of 1500 to 200 000 g/mol. In addition to carboxyl groups, the polymer chain may display further substituents, especially methyl (meth)acrylate, butyl (meth)acrylate and/or 2-ethylhexyl (meth)acrylate.

In a preferred embodiment, the polyacrylic or polymethacrylic acid or ester is obtainable by free-radical or cationically initiated polymerization of (meth)acrylic acid or of a (meth)acrylic ester.

Polyvinylthiol suitable for the purposes of the present invention comprises recurring vinylthiol units of the formula

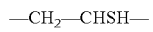
—$CH_2$—CHSH—

In a very particularly preferred embodiment, polymer P is a polyvinylthiol, especially with a molar mass of 10 000 to 500 000 g/mol, preferably of 20 000 to 200 000 g/mol and more preferably of 30 000 to 100 000 g/mol. In addition to the thiol groups, the polymer chain may display further substituents, more particularly alkyl or aryl moieties (and also side chains such as, for example, butyral which are grafted-on or incorporated via comonomers).

It is further preferable according to the present invention to use mixtures of two or more of said polymers P, especially mixtures comprising a polyvinylamine and a polyvinyl alcohol.

In the preferably used mixtures of two or more abovementioned polymers P, the individual polymers P are each present at, for example, 1 to 99 wt %, preferably 15 to 85 wt % and more preferably 20 to 80 wt %, subject to the proviso that the sum total of polymers P present adds up to 100 wt % in each case.

Preference according to the present invention is given to a mixture comprising 10 to 50 wt %, preferably 15 to 40 wt % and more preferably 20 to 30 wt % of a polyvinyl alcohol and 50 to 90 wt %, preferably 60 to 85 wt % and more preferably 70 to 80 wt % of a polyvinylamine, the sum total adding up to 100 wt % in each case.

In addition to the binder of the present invention, i.e., polymer P, further organic/inorganic binders can be used in an amount of 0.1 to 50 wt %, based on the binder constructed from at least one isocyanate and at least one polymer. Further suitable organic binders are for example the binders known from EP 672 635 A1, such as reactive adhesives such as epoxy resin adhesives, phenol-, resorcinol-, urea- and melamine-formaldehyde resins, silicone resin adhesives, polyimide and polybenzimidazole resins, hot-melt adhesives such as ethylene-vinyl acetate copolymers and polyamides, waxes, and also aqueous dispersion adhesives such as styrene-butadiene and styrene-acrylic ester copolymers. The binder may additionally comprise, as indicated for example in EP 06 72 625 A1, sheet-silicates and/or clay minerals.

Additives

The composite material may comprise effective amounts of further addition agents such as, for example, dyes, pigments, fillers, flame retardants, synergists for flame retardants, antistats, stabilizers, plasticizers and IR opacifiers.

To reduce the radiative contribution to thermal conductivity, the composite material may comprise IR opacifiers such as, for example, melamine, metal oxides, nonmetal oxides, metal powders, e.g., aluminum powder, carbon, e.g., carbon black, graphite, diamond or organic dyes and dye pigments, which is advantageous for uses at high temperatures in particular. Particular preference is given to carbon black, titanium dioxide, iron oxides or zirconium dioxide. The aforementioned materials can be used in each case not only singly but also in combination, i.e., in the form of a mixture of two or more materials.

With regard to cracking and breaking strength, it can further be advantageous for the composite material to comprise fibers. As fiber material there may be used organic fibers such as, for example, polypropylene, polyester, nylon or melamine-formaldehyde fibers and/or inorganic fibers, for example glass, mineral and also SiC fibers and/or carbon fibers and also carbon nanotubes.

Useful fillers include for example sheet-silicates, clay minerals, metal oxides, silica gel, glass spheres and also further fillers known to a person skilled in the art and also their mixtures.

The fire class of the composite material obtained after drying is determined by the fire class of the nanoporous particles and also, optionally, the fire class of the fiber material. To achieve a very favorable fire class for the composite material (low-flammable or incombustible), any fibers present should consist of noncombustible material, e.g., mineral, glass or SiC fibers.

In order to avoid increased thermal conductivity due to the added fibers, the volume fraction of fibers should preferably be 0.1 to 30 wt % and more preferably 1 to 10 wt %, all based on the entire composite material.

A suitable choice of fiber diameter and/or material can reduce the radiative contribution to thermal conductivity and increase mechanical strength. For this, fiber diameter should preferably be in the range from 0.1 to 30 µm.

The radiative contribution to thermal conductivity can be particularly reduced when using carbon fibers or carbon-containing fibers.

Mechanical strength can further be influenced by fiber length and distribution in the composite material. Preference is given to using fibers between 0.5 and 10 cm in length. Fabrics woven from fibers can also be used for plate-shaped articles.

The composite material may additionally comprise further auxiliary materials, for example Tylose, starch, and/or wax emulsions, as are used in the prior art on a large industrial scale in the shaping of ceramic compositions.

The composite material may further comprise addition agents used in its method of making and/or formed in its method of making, for example slip agents for compression molding, such as zinc stearate, or the reaction products of acidic or acid-detaching cure accelerants in the event of using resins.

The fire class of the composite material is determined by the fire class of the nanoporous particles, optionally of the fibers and of the binder and also of further substances optionally present. To achieve a very favorable fire class for the composite material, it is preferable to use nonflammable types of fibers, for example glass or mineral fibers, or low-flammable types of fibers such as, for example, TREVIRA C® or melamine resin fibers, aerogels based on inorganics and more preferably based on $SiO_2$, and low-flammable binders such as, for example, inorganic binders or urea- or melamine-formaldehyde resins, silicone resin adhesives, polyimide resins and polybenzimidazole resins.

The composite materials of the present invention have thermal conductivities of preferably 10 to 100 mW/m*K, more preferably 10 to 50 mW/m*K, even more preferably 11 to 40 mW/m*K and particularly preferably 12 to 22 mW/m*K.

The present invention further provides a composition for producing a composite material according to the present invention, comprising nanoporous particles, at least one isocyanate and at least one polymer P selected from the group consisting of polyvinylamine, poly(meth)acrylic acid, poly(meth)acrylic ester, polyvinyl alcohol, polyvinylthiol and mixtures thereof. With regard to this composition, the remarks made with regard to the composite material of the present invention apply accordingly.

Producing the Composite Materials

The composite materials of the present invention are preferably produced by mixing said nanoporous particles, said at least one isocyanate and said at least one polymer P selected from the group consisting of polyvinylamine, poly(meth)acrylic acid, poly(meth)acrylic ester, polyvinyl alcohol, polyvinylthiol and mixtures thereof, crosslinking by reacting said at least one isocyanate and said at least one polymer P and the material thus obtained being either a) subjected directly to a shaping operation and optional curing, or b) pelletized, stored and subjected to shaping and optionally curing as or when required.

The composite materials of the present invention are preferably produced by mixing said nanoporous particles, said at least one isocyanate and said at least one polymer P selected from the group consisting of polyvinylamine, poly(meth)acrylic acid, poly(meth)acrylic ester, polyvinyl alcohol, polyvinylthiol and mixtures thereof, crosslinking by reacting said at least one isocyanate and said at least one polymer P and the material thus obtained being either a) subjected directly to a shaping operation and optional curing, or b) pelletized, stored and subjected to shaping and optionally curing as or when required The at least one polymer P here is preferably water-soluble or water-emulsifiable/dispersible, more preferably water-soluble. The at least one isocyanate is preferably emulsifiable in water or has been modified to be emulsifiable in water, or is rendered emulsifiable in water by suitable addition agents.

Preferably, nanoporous particles of the present invention, more particularly silica aerogel particles having an average diameter $d_{50}$ of 0.001 to 8 mm, are coated and/or mixed with, for example, an aqueous dispersion which optionally aerosils, sheet-silicates and/or clay minerals and the at least one polymer P selected from the group consisting of polyvinylamine, poly(meth)acrylic acid poly(meth)acrylic ester, polyvinyl alcohol, polyvinylthiol and mixtures thereof. In a further step, an aqueous emulsion comprising the at least one isocyanate is preferably admixed to the mass subsequently or in the same operation. Optionally, not only the at least one polymer P but also the at least one isocyanate can be present in the same aqueous mixture as a solution and/or emulsion/dispersion and as an emulsion/dispersion.

The mass is then preferably cured in a mold. Polymeric films can be used here to line the mold and facilitate subsequent demolding.

In a preferred embodiment of the process according to the present invention, the sufficiently cured mass is demolded and dried. In a particularly preferred embodiment of the process according to the present invention, the sufficiently cured mass is dried at room temperature and ambient pressure after demolding. This can be accomplished for example by storing the mass on or between gratings in order that water may escape uniformly.

The composite materials, especially plates, of the present invention generally have a certain open-cell content. Without wishing to be tied to any one theory, it is believed that the open-cell content is a direct consequence of carbon dioxide being formed in the reaction of isocyanate with water. The open-cell content is easily determined from the volume of water imbibed by the composite material following storage under water (in accordance with EN 12087 Method 2A, drip-drain).

The open-cell content is adjustable, for example by varying the concentrations of reactants and thus by varying the amount of carbon dioxide produced. The open-cell content of plates is advantageous not only in production, in that for example residual quantities of the processing aid water are easier to remove via the open cells of the composite material, but also in the end properties of the plates, since the composite-material plates have a reduced density due to the porous structure, and the plates are partly air-permeable as a result of the open-cell structure, so they can be used not only outdoors but also indoors. Indoors, an infestation by fungi, for example molds or the like, can be prevented in this way for example.

When the composite material of the present invention is used in the form of sheetlike bodies, for example plates or mats, especially plates, it may comprise at least one further foam, especially polyurethane and/or polystyrene.

The present invention accordingly also provides shaped articles, especially plates, formed from a composite material of the present invention and at least one further foam, especially polyurethane and/or polystyrene.

In the shaped article of the present invention, said at least one further foam can be laminated on said composite material or said at least one further foam is mixed with said composite material.

The present invention accordingly relates with preference to the shaped article of the present invention wherein said at least one further foam is laminated on said composite material or said at least one further foam is mixed with said composite material. Processes for effecting lamination are known per se to a person skilled in the art. In a preferred process, the material for laminating the composite material of the present invention is firmly adhered to the composite material of the present invention in the shaping operation. To this end, the laminating material is also placed in the mold on one or more sides.

The shaped articles of the present invention in a further embodiment may be coated, preferably laminated, with an outer layer. In a preferred process, the material for laminating the composite material of the present invention is firmly adhered to the composite material of the present invention in the shaping operation. To this end, the laminating material is also placed in the mold on one or more sides.

The present invention accordingly relates with preference to the shaped article of the present invention wherein at least one outer layer is laminated on said composite material.

An appropriate outer layer can be present according to the present invention in order, for example, to improve the properties of the surface, for instance to enhance its robustness, turn it into a vapor barrier or guard it against easy soiling. Outer layers can also be used to improve the mechanical stability of the shaped article. When outer layers are used on both faces of the shaped article, these outer layers can be the same or different.

Useful outer layers include any materials known to a person skilled in the art. They can be nonporous and hence act as a vapor barrier, for example polymeric films, preferably metal foils or metalized polymeric films that reflect thermal radiation, but it is also possible to use porous outer layers which allow air to penetrate into the material and hence lead to superior acoustical insulation, examples being porous films/foils, papers, wovens or nonwovens, for example basalt nonwovens. These porous outer layers have the advantage that they allow the composite material of the present invention to dry more rapidly, and that they preserve the open-cell content thereof. Basalt nonwovens can improve the adherence to concrete for example.

Lamination may further be effected for example, with substantial retention of the acoustic properties, with so-called "open" systems, for example perforated plates.

The outer layers may themselves also comprise two or more layers. The outer layers can be secured with the binder with which the fibers and the aerogel particles are bonded to and between each other, but it is also possible to use some other adhesive.

The surface of the composite material can also be closed and consolidated by incorporating at least one suitable material into a surface layer. Useful materials include, for example, thermoplastic polymers, for example polyethylene and polypropylene, or resins such as melamine-formaldehyde resins for example.

The composite materials of the present invention have outstanding mechanical properties (enhanced breaking strength for example) and thermal insulation properties (thermal conductivities of less than 0.025 W/m*K can be achieved in general) and so can be used in a wide variety of fields.

Examples thereof are the thermal and/or acoustical insulation of buildings, fuel boilers, cooling appliances, baking ovens (cf. EP-A-0 475 285), heating pipes, district heating lines, liquid gas containers, night storage ovens and also vacuum insulation in technical appliances of various kinds.

More particularly, the composite materials of the present invention are useful for internal insulation to achieve a low-energy standard, for external insulation, optionally combined with cementitious and inorganic adhesives, and also as part of a combination of base render, reinforcing mortar and top render, for roof insulation, and also in technical applications in refrigerators, transportation boxes, sandwich elements, pipe insulation and technical foams.

A further advantage of composite materials according to the present invention is therebesides that their surface is homogeneous and smooth. The composite materials are also particularly simple to work/machine by sawing, sanding or cutting. Individual aerogel particles do not detach in the process, so that the worked/machined surfaces also have a homogeneous appearance.

A further advantage of composite materials according to the present invention is a particularly low fire load by virtue of their low fraction of combustible, i.e., organic, components. This is achieved through a generally low amount of organic binder.

The present invention accordingly also provides for the use of a composite material according to the present invention or of a shaped article according to the present invention for thermal and/or acoustical insulation.

EXAMPLES

The following components were used in the examples and comparative tests:
Polymer 1: Lupamin® 9095 linear polyvinylamine from BASF SE, Ludwigshafen, Germany, average molecular weight 340 000 g/mol, 20 wt % solution in water
Polymer 2: polyacrylic acid from Sigma-Aldrich Chemie GmbH, Steinheim, Germany, average molecular weight Mw=100 000 g/mol, 35 wt % solution in water
Polymer 3: polyvinyl alcohol from Sigma-Aldrich Chemie GmbH, Steinheim, Germany, average molecular weight Mw=31 000 to 50 000 g/mol, 87 to 89% hydrolyzed, a solid material
Prepolymer 1: isocyanate obtained from the reaction of Basonat® HA 300 (Allophanate-modified polyisocyanate based on isocyanurated hexamethylene diisocyanate, solvent-free, NCO content 19 to 20%) with 2 wt % of Pluriol® A500E (methylated polyethylene glycol, average molecular weight 500 g/mol), both BASF SE, Ludwigshafen, Germany, a liquid material
Prepolymer 2: Basonat® F 200 WD water-emulsifiable isocyanate based on hexamethylene diisocyanate, solvent-free, from BASF SE, Ludwigshafen, Germany, a liquid material
$SiO_2$ aerogel: Cabot Nanogel TLD 302, $SiO_2$, (trimethylsilyl)oxy-modified
Filler 1: Aerosil® 200 hydrophilic pyrogenous silica having a specific surface area of 200 $m^2/g$, from Evonik Industries AG, Essen, Germany, a solid material
Filler 2: C14 barite flour, 82 wt % of $BaSO_4$, 11 wt % of $CaF_2$, 6 wt % of $SiO_2$, from Sachtleben GmbH, Duisburg, Germany, a solid material
Hollow glass spheres: 3M™ Glass Bubbles S32, hollow sphere diameter 90%<70 μm, typical density 320 g/L, from 3M, St. Paul, USA, a solid material Example 1

100 g of $SiO_2$ aerogel were mixed with 100 g of an aqueous solution comprising 5.8 g of polymer 1 (reckoned as solid material). This mixture was admixed with an emulsion of 2.9 g of prepolymer 1 in 5 g of water, obtained by vigorous shaking in a closed plastics container, followed by further thorough commixing. The mass was placed in a PE-film-lined metallic mold measuring 20.4 cm×20.4 cm×4 cm, and squeezed down to a thickness of about 2 cm with a screw device.

The entire device was stored at 60° C. for 1 h, and the composite plate obtained was demolded and dried in an oven at 60° C. to constant weight. The following values were measured on the plate after it had cooled down:
Plate thickness: 2.2 cm
Density: 120 g/L
Binder content: 7.9 wt %
Thermal conductivity: 16.7 mW/m*K at 10° C.

Compressive strength/stress: 85 kPa
Flexural strength/stress
at 10% compression: 30 kPa
E modulus: 1030 kPa

Example 2

100 g of $SiO_2$ aerogel were mixed with 100 g of an aqueous solution comprising 5.8 g of polymer 1 (reckoned as solid material). This mixture was admixed with an emulsion of 2.9 g of prepolymer 1 in 5 g of water, obtained by vigorous shaking in a closed plastics container, followed by further thorough commixing. The mass was placed in a PE-film-lined metallic mold measuring 20.4 cm×20.4 cm×4 cm, and squeezed down to a thickness of about 2 cm with a screw device.

The entire device was stored at 60° C. for 1 h, and the composite plate obtained was demolded and dried in an oven at 60° C. to constant weight. The following values were measured on the plate after it had cooled down:
Plate thickness: 2.3 cm
Density: 111 g/L
Binder content: 8.2 wt %
Thermal conductivity: 16.1 mW/m*K at 10° C.
Compressive strength/stress: 41 kPa
Flexural strength/stress
at 10% compression: 20 kPa
E modulus: 470 kPa

Example 3

100 g of $SiO_2$ aerogel were mixed with 100 g of an aqueous solution comprising 5.8 g of polymer 3 (reckoned as solid material). This mixture was admixed with an emulsion of 2.9 g of prepolymer 1 in 5 g of water, obtained by vigorous shaking in a closed plastics container, followed by further thorough commixing. The mass was placed in a PE-film-lined metallic mold measuring 20.4 cm×20.4 cm×4 cm, and squeezed down to a thickness of about 2 cm with a screw device.

The entire device was stored at 60° C. for 1 h, and the composite plate obtained was demolded and dried in an oven at 60° C. to constant weight. The following values were measured on the plate after it had cooled down:
Plate thickness: 2.2 cm
Density: 116 g/L
Binder content: 8.2 wt %
Thermal conductivity: 16.1 mW/m*K at 10° C.
Compressive strength/stress: 53 kPa
Flexural strength/stress
at 10% compression: 40 kPa
E modulus: 690 kPa

Example 4

100 g of $SiO_2$ aerogel were mixed with 100 g of an aqueous solution comprising 4.3 g of polymer 3 (reckoned as solid material). This mixture was admixed with an emulsion of 2.1 g of prepolymer 1 in 5 g of water, obtained by vigorous shaking in a closed plastics container, followed by further thorough commixing. The mass was placed in a PE-film-lined metallic mold measuring 20.4 cm×20.4 cm×4 cm, and squeezed down to a thickness of about 2 cm with a screw device.

The entire device was stored at 60° C. for 1 h, and the composite plate obtained was demolded and dried in an oven at 60° C. to constant weight. The following values were measured on the plate after it had cooled down:
Plate thickness: 2.5 cm
Density: 100 g/L
Binder content: 6.1 wt %
Thermal conductivity: 16.9 mW/m*K bei 10° C.
Compressive strength/stress: 27 kPa
Flexural strength/stress
at 10% compression: 20 kPa
E modulus: 330 kPa

Example 5

100 g of $SiO_2$ aerogel were mixed with 100 g of an aqueous solution comprising 7.5 g of polymer 3 (reckoned as solid material). This mixture was admixed with an emulsion of 3.6 g of prepolymer 1 in 5 g of water, obtained by vigorous shaking in a closed plastics container, followed by further thorough commixing. The mass was placed in a PE-film-lined metallic mold measuring 20.4 cm×20.4 cm×4 cm, and squeezed down to a thickness of about 2 cm with a screw device.

The entire device was stored at 60° C. for 1 h, and the composite plate obtained was demolded and dried in an oven at 60° C. to constant weight. The following values were measured on the plate after it had cooled down:
Plate thickness: 2.4 cm
Density: 110 g/L
Binder content: 10.1 wt %
Thermal conductivity: 16.1 mW/m*K bei 10° C.
Compressive strength/stress: 45 kPa
Flexural strength/stress
at 10% compression: 40 kPa
E modulus: 480 kPa

Example 6

100 g of $SiO_2$ aerogel were mixed with 100 g of an aqueous solution comprising 9.1 g of polymer 3 (reckoned as solid material). This mixture was admixed with an emulsion of 4.6 g of prepolymer 1 in 5 g of water, obtained by vigorous shaking in a closed plastics container, followed by further thorough commixing. The mass was placed in a PE-film-lined metallic mold measuring 20.4 cm×20.4 cm×4 cm, and squeezed down to a thickness of about 2 cm with a screw device.

The entire device was stored at 60° C. for 1 h, and the composite plate obtained was demolded and dried in an oven at 60° C. to constant weight. The following values were measured on the plate after it had cooled down:
Plate thickness: 2.5 cm
Density: 107 g/L
Binder content: 12.4 wt %
Thermal conductivity: 17.1 mW/m*K bei 10° C.
Compressive strength/stress: 22 kPa
Flexural strength/stress
at 10% compression: 30 kPa
E modulus: 180 kPa The inventive examples are able to show that specifically the binder content of the present invention gives particularly advantageous properties, for example thermal conductivity and mechanical parameters.

Example 7

100 g of $SiO_2$ aerogel were mixed with 73.5 g of an aqueous solution comprising 4.35 g of polymer 1 (reckoned as solid material). This mixture was admixed with 26.5 g of an aqueous solution comprising 1.45 g of polymer 3 (reckoned as solid material). To this mixture was added an emulsion of 2.9 g of prepolymer 2 in 5 g of water, obtained by vigorous shaking in a closed plastics container, followed by further thorough commixing. The mass was placed in a PE-film-lined metallic mold measuring 20.4 cm×20.4 cm×4 cm, and squeezed down to a thickness of about 2 cm with a screw device.

The entire device was stored at 60° C. for 1 h, and the composite plate obtained was demolded and dried in an oven at 60° C. to constant weight. The following values were measured on the plate after it had cooled down:
Plate thickness: 2.1 cm
Density: 129 g/L
Binder content: 11.4 wt %
Thermal conductivity: 16.7 mW/m*K bei 10° C.
Compressive strength/stress: 76 kPa
Flexural strength/stress
at 10% compression: 50 kPa
E modulus: 940 kPa Example 8

73.5 g of an aqueous solution comprising 4.35 g of polymer 1 (reckoned as solid material) were mixed with 26.5 g of an aqueous solution comprising 1.45 g of polymer 3 (reckoned as solid material). 25 g of hollow glass spheres were stirred into this solution. 100 g of SiO$_2$ aerogel were stirred up with the mixture described above, followed by the addition of an emulsion of 2.9 g of prepolymer 2 in 5 g of water obtained by vigorous shaking in a closed plastics container, followed by further thorough commixing. The mass was placed in a PE-film-lined metallic mold measuring 20.4 cm×20.4 cm×4 cm, and squeezed down to a thickness of about 2 cm with a screw device.

The entire device was stored at 60° C. for 1 h, and the composite plate obtained was demolded and dried in an oven at 60° C. to constant weight. The following values were measured on the plate after it had cooled down:
Plate thickness: 2.2 cm
Density: 148 g/L
Binder content: 7.9 wt %
Thermal conductivity: 19.0 mW/m*K bei 10° C.
Compressive strength/stress: 139 kPa
Flexural strength/stress
at 10% compression: 130 kPa
E modulus: 2090 kPa Example 9

73.5 g of an aqueous solution comprising 4.35 g of polymer 1 (reckoned as solid material) were mixed with 26.5 g of an aqueous solution comprising 1.45 g of polymer 3 (reckoned as solid material). 2.9 g of filler 1 were stirred into this solution. 100 g of SiO$_2$ aerogel were stirred up with the mixture described above, followed by the addition of an emulsion of 2.9 g of prepolymer 2 in 5 g of water obtained by vigorous shaking in a closed plastics container, followed by further thorough commixing. The mass was placed in a PE-film-lined metallic mold measuring 20.4 cm×20.4 cm×4 cm, and squeezed down to a thickness of about 2 cm with a screw device.

The entire device was stored at 60° C. for 1 h, and the composite plate obtained was demolded and dried in an oven at 60° C. to constant weight. The following values were measured on the plate after it had cooled down:
Plate thickness: 2.2 cm
Density: 126 g/L
Binder content: 10.7 wt %
Thermal conductivity: 16.6 mW/m*K bei 10° C.
Compressive strength/stress: 53 kPa
Flexural strength/stress
at 10% compression: 50 kPa
E modulus: 700 kPa Example 10

73.5 g of an aqueous solution comprising 4.35 g of polymer 1 (reckoned as solid material) were mixed with 26.5 g of an aqueous solution comprising 1.45 g of polymer 3 (reckoned as solid material). 25 g of filler 2 were stirred into this solution. 100 g of SiO$_2$ aerogel were mixed with 25 g of filler 2 and stirred up with the mixture described above, followed by the addition of an emulsion of 2.9 g of prepolymer 2 in 5 g of water obtained by vigorous shaking in a closed plastics container, followed by further thorough commixing. The mass was placed in a PE-film-lined metallic mold measuring 20.4 cm×20.4 cm×4 cm, and squeezed down to a thickness of about 2 cm with a screw device.

The entire device was stored at 60° C. for 1 h, and the composite plate obtained was demolded and dried in an oven at 60° C. to constant weight. The following values were measured on the plate after it had cooled down:
Plate thickness: 2.1 cm
Density: 184 g/L
Binder content: 6.5 wt %
Thermal conductivity: 19.1 mW/m*K bei 10° C.
Compressive strength/stress: 84 kPa
Flexural strength/stress
at 10% compression: 80 kPa
E modulus: 900 kPa Small amounts of filler have a positive effect on the processability of the polymer solutions, since their viscosity increases, thus making it possible to achieve better disbursement on and between the aerogel particles. The final properties of the composite plate remain virtually unchanged.

Higher proportions of hollow glass spheres have a similar improving effect on the processability and also the mechanical end properties of the composite plates.

Example 8 shows the use of a filler of relatively low density, while Example 10 utilizes a filler of relatively high density. In both cases, the overall flammability of the composite material can be reduced by using the additional inorganic material. The effects on the physical properties point essentially in the same direction, but do vary in their absolute magnitude, which is attributable to density, volume and surface area of the particular fillers and also their influence on the adhesive bonding of the composite material.

The invention claimed is:
1. A composite material comprising
nanoporous aerogel particles or pyrogenous silica particles, and
at least one binder prepared by reacting at least one water-emulsifiable prepolymer and at least one water-soluble, or water-dispersible polymer selected from the group consisting of a polyvinylamine having a molecular weight of 10,000 to 1,000,000 g/mol, a polyvinyl alcohol having a molecular weight of 10,000 to 500,000 g/mol, a polyvinylthiol having a molecular weight of 10,000 to 500,000 g/mol, and any mixture thereof, wherein the reaction results in crosslinking of the at least one water-emulsifiable prepolymer with the at least one water-soluble or water-dispersible polymer, wherein the at least one binder is present in an amount of 0.1 wt % to 20 wt %, relative to an amount of the nanoporous aerogel particles or the pyrogenous silica particles, and the at least one water-emulsifiable prepolymer is prepared from an isocyanate compound and at least one compound that includes Zerewitinow-reactive groups selected from the group consisting of a polyol, a sulfonic acid, and mixtures thereof.

2. The composite material according to claim 1 wherein the nanoporous aerogel particles or the pyrogenous silica particles are granular.

3. The composite material according to claim 1 wherein the at least one compound comprising Zerewitinow-reactive groups is a polyethylene glycol having a molecular weight of 200 to 6000 g/mol, an alkylpolyethylene glycol having a molecular weight of 200 to 2000 g/mol, or any mixture thereof.

4. The composite material according to claim 1 wherein the nanoporous aerogel particles or the pyrogenous silica particles includes a hydrophobic coating.

5. The composite material according to claim 1 wherein the at least one water-soluble, or water-dispersible polymer comprises the mixture of the polyvinylamine, the polyvinyl alcohol, and a polyacrylic acid having a molecular weight of 1000 to 400,000 g/mol, and a filler selected from the group consisting of sheet-silicates, clay minerals, metal oxides, silica gel, and glass spheres.

6. A process for producing a composite material according to claim 1, comprising:
reacting at least one water-emulsifiable prepolymer, and at least one water-soluble or water-dispersible polymer selected from the group consisting of a polyvinylamine having a molecular weight of 10,000 to 1,000,000 g/mol, a polyvinyl alcohol having a molecular weight of 10,000 to 500,000 g/mol, a polyvinylthiol having a molecular weight of 10,000 to 500,000 g/mol, and any mixture thereof, wherein the reaction results in crosslinking of the at least one water-emulsifiable prepolymer with the at least one water-soluble or water-dispersible polymer to provide a composition;
mixing the composition with nanoporous aerogel particles or pyrogenous silica particles to form a mixture that is
a) subjected to a shaping operation and optional curing, or
b) pelletized, and subjected to shaping and optionally curing.

7. A shaped article comprising a composite material according to claim 1 and at least one additional foam material.

8. The shaped article according to claim 7 wherein the at least one additional foam material is laminated to the composite material, or mixed with the composite material.

9. The shaped article according to claim 8 wherein the at least one additional foam material comprises polyurethane, polystyrene, or a mixture thereof.

10. The shaped article according to claim 7 further comprising at least one outer layer that is laminated to the composite material.

11. A thermal or acoustical insulation comprising the composite material according to claim 1.

12. A composite material comprising:
nanoporous aerogel particles or pyrogenous silica particles; and
a binder prepared from reacting a mixture of a polyvinylamine having a molecular weight of 10,000 to 500,000 g/mol, a polyvinyl alcohol having a molecular weight of 10,000 to 100,000 g/mol, and a water-emulsifiable prepolymer prepared from an isocyanate compound and a compound that includes Zerewitinow-reactive groups selected from the group consisting of a polyol, a sulfonic acid, and a mixture thereof, wherein the reaction of said polyvinylamine, polyvinyl alcohol and water-emulsifiable prepolymer results in crosslinking of the water-emulsifiable prepolymer with polyvinylamine and polyvinyl alcohol, wherein the binder is present in an amount of 0.1 wt % to 20 wt %, relative to an amount of the nanoporous aerogel particles or the pyrogenous silica particles.

13. The composite material according to claim 12 in the form of a plate.

14. The composite material according to claim 12 wherein the compound that includes Zerewitinow-reactive groups is an isocyanate-reactive sulfonic acid.

15. The composite material according to claim 12 wherein the prepolymer prepared from an isocyanate compound and a compound comprising Zerewitinow-reactive groups is a polyethylene glycol having a molecular weight of 200 to 6000 g/mol, an alkylpolyethylene glycol having a molecular weight of 200 to 2000 g/mol, or any mixture thereof.

16. The composite material according to claim 15 wherein the binder further comprises a polyacrylic acid having a molecular weight of 1000 to 400,000 g/mol, the composite material further comprises a filler selected from the group consisting of sheet-silicates, clay minerals, metal oxides, silica gel, and glass spheres, and the composite material has a flexural strength/stress at 10% compression of from 50 kPa to 130 kPa.

17. The composite material according to claim 12, wherein the composite material has a thermal conductivity of 12 to 22 mW/m·K.

18. The composite material according to claim 12 wherein the binder further comprises a polyacrylic acid having a molecular weight of 1000 to 400,000 g/mol.

19. The composite material according to claim 18 further comprising a filler selected from the group consisting of sheet-silicates, clay minerals, metal oxides, silica gel, and glass spheres, and the composite material has a flexural strength/stress at 10% compression of from 50 kPa to 130 kPa.

20. The composite material according to claim 12, wherein the nanoporous aerogel particles are is present and the composite material has a thermal conductivity of 12 to 22 mW/m·K.

21. The composite material according to claim 12, wherein the pyrogenous silica particles are present and the composite material has a thermal conductivity of 12 to 22 mW/m·K.

22. A composite material comprising:
nanoporous aerogel particles or pyrogenous silica particles,
at least one binder prepared by reacting at least one water-emulsifiable prepolymer, and at least one water-soluble, or water-dispersible polymer prepared from a polyvinylamine having a molecular weight of 10,000 to 1,000,000 g/mol, a polyvinyl alcohol having a molecular weight of 10,000 to 500,000 g/mol, and a polyacrylic acid having a molecular weight of 1000 to 400,000 g/mol, wherein the reaction of the water-emulsifiable prepolymer with the at least one water-soluble or water-dispersible polymer results in crosslinking of the water-emulsifiable prepolymer with the at least one water-soluble or water-dispersible polymer, and
a filler selected from the group consisting of sheet-silicates, clay minerals, metal oxides, silica gel, and glass spheres, wherein the at least one binder is present in an amount of 0.1 wt % to 20 wt %, relative to an amount of the nanoporous aerogel particles or the pyrogenous silica particles and the at least one water-emulsifiable prepolymer is prepared from an isocyanate compound and at least one compound that includes Zerewitinow-reactive groups selected from a polyol, a sulfonic acid, or a mixture thereof.

* * * * *